United States Patent [19]
Gardam et al.

[11] Patent Number: 5,755,417
[45] Date of Patent: May 26, 1998

[54] LOCKING DEVICE

[75] Inventors: Allan Gardam, Rhuddlan; Andrew David Reeze Jones, Waen, both of United Kingdom

[73] Assignee: Pilkington P.E. Limited, United Kingdom

[21] Appl. No.: 541,344

[22] Filed: Oct. 10, 1995

[30] Foreign Application Priority Data

Oct. 8, 1994 [GB] United Kingdom ............... 9420335

[51] Int. Cl.⁶ .................................... E04G 3/00
[52] U.S. Cl. ..................... 248/291.1; 248/292.14
[58] Field of Search .................. 248/412, 221.11, 248/222.13, 222.51, 222.52, 229.11, 229.21, 228.2, 230.2, 231.31, 291.1, 477, 478, 479, 549, 486, 289.1, 299.1, 292.14

[56] References Cited

U.S. PATENT DOCUMENTS

| | | | |
|---|---|---|---|
| 2,700,949 | 2/1955 | Kunzi | 248/291.1 |
| 5,242,204 | 9/1993 | Kitterman | 248/289.11 |
| 5,432,640 | 7/1995 | Gilbert | 248/549 |
| 5,451,022 | 9/1995 | Peterson | 248/289.11 |
| 5,487,522 | 1/1996 | Hook | 248/549 |

FOREIGN PATENT DOCUMENTS

| | | |
|---|---|---|
| 0016268 | 10/1980 | European Pat. Off. . |
| 269005 | 4/1927 | United Kingdom . |
| 916411 | 1/1963 | United Kingdom . |

Primary Examiner—Leslie A. Braun
Assistant Examiner—Gwendolyn W. Baxter
Attorney, Agent, or Firm—Young & Basile, P.C.

[57] ABSTRACT

A locking mechanism for releasably locking a rotatable arm 3 to a generally cylindrical axle or wheel 6. The mechanism comprises a slot 7 extending around a region of the axle 6, the slot having first and second abutment surfaces spaced apart in the direction of said movement. A heel member 17, rigidly fixed to the arm 3, projects from the arm into the slot and provides third and fourth spaced apart abutment surfaces 19,27, said third abutment surface 19 being arranged to engage said first abutment surface 18 to prevent rotation of the axle 6 in a first direction. A locking wedge 21 is provided which is moveable between a first release position in which the wedge lies outside the slot 7 and a second locking position in which the wedge projects into the slot to engage said second abutment surface 10 of the slot and said fourth abutment surface 27 of the heel member 17 to prevent rotation of the axle 6 in a second direction opposite to said first direction.

6 Claims, 3 Drawing Sheets

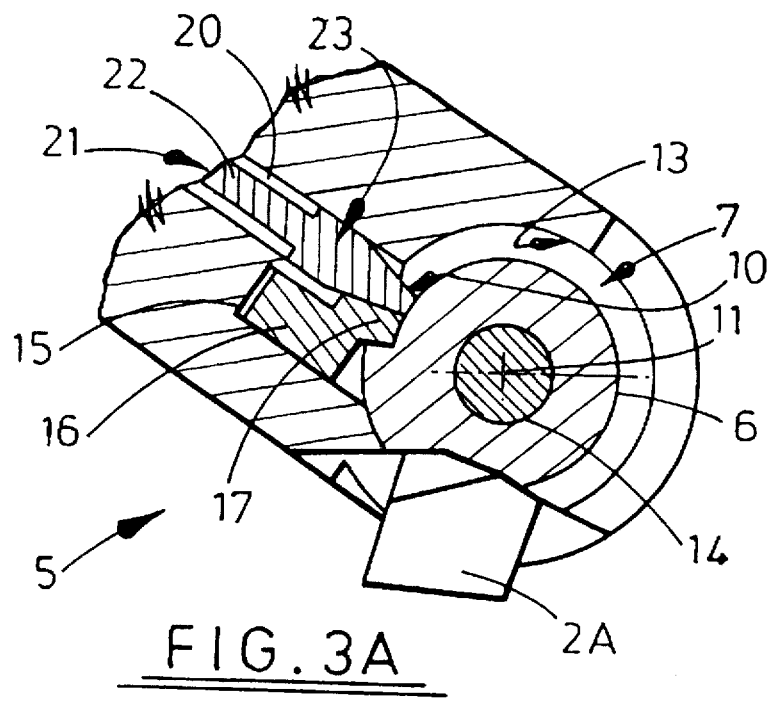
FIG. 3A
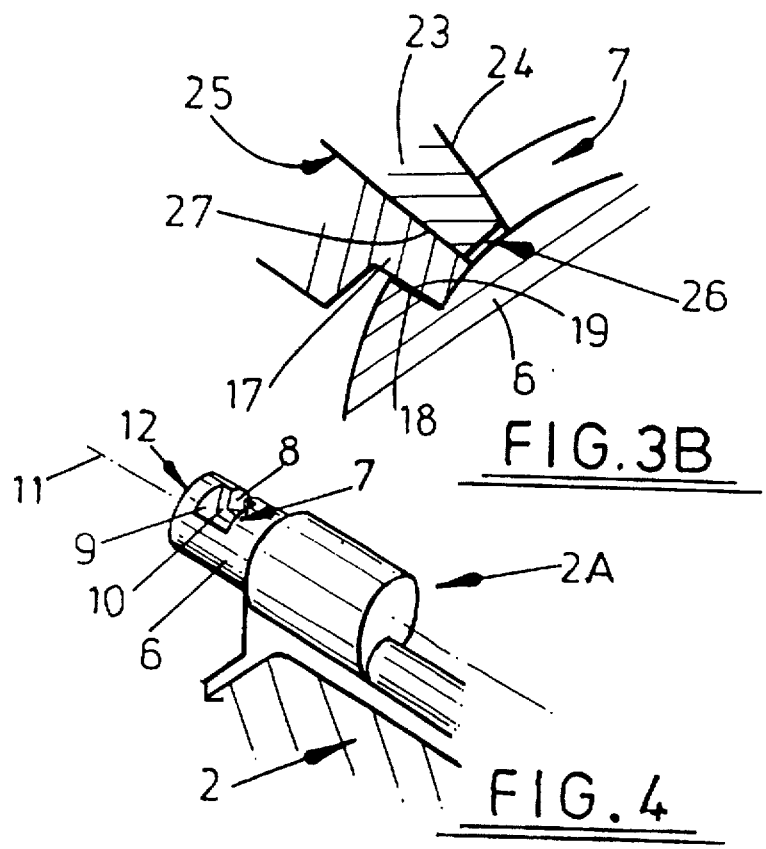
FIG. 3B
FIG. 4

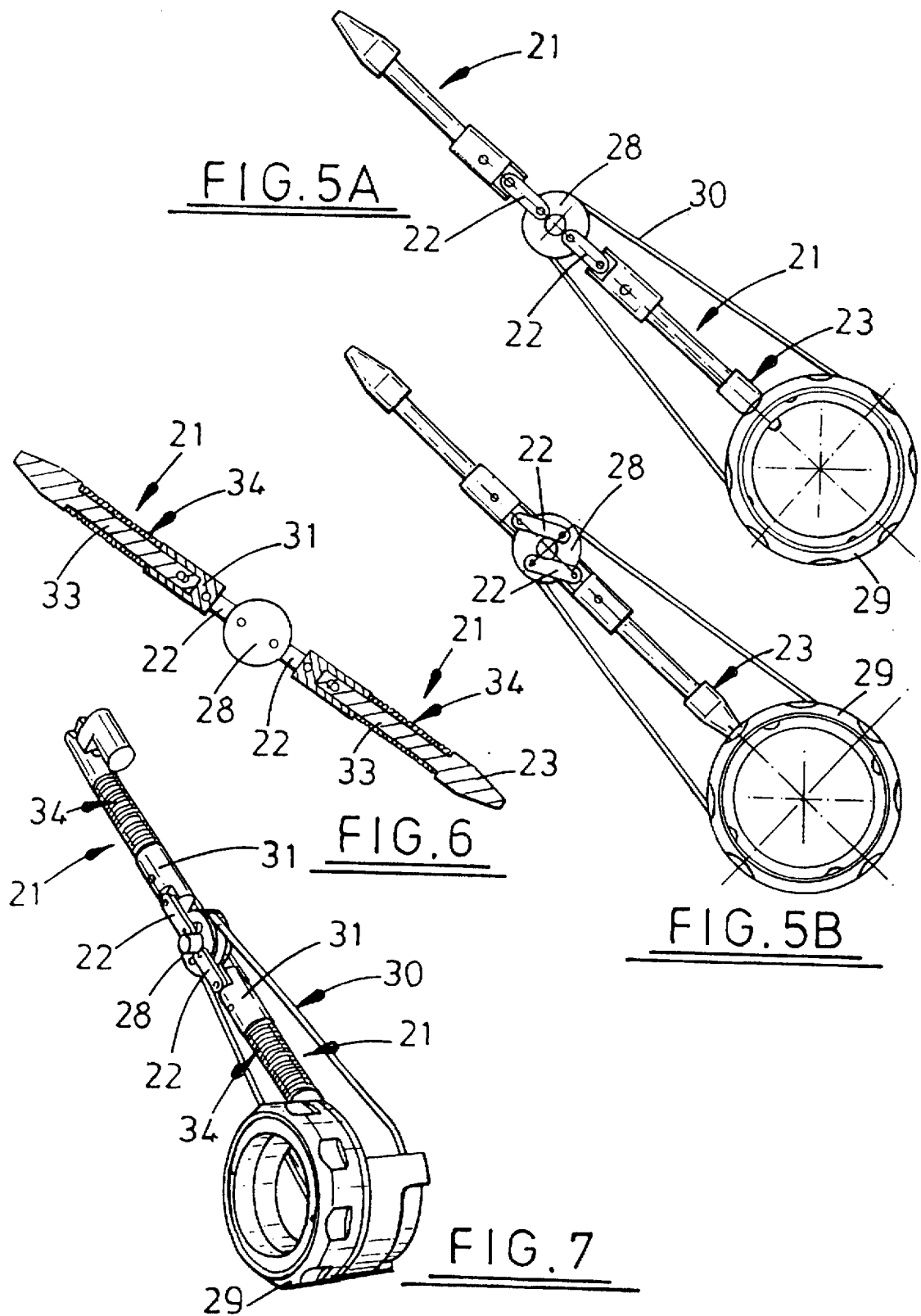

LOCKING DEVICE

The present invention relates to apparatus for releasably locking a first member to a second member where the first member is coupled to the second member for limited movement relative thereto when unlocked.

In many technical fields there is a need to be able to lock a first member which is normally movable relative to a second member to the second member in such a way that relative movement of the two members, for example due to vibration, is reduced to an absolute minimum.

One such field is that of head-up displays (HUD) such as are commonly used in civil and military aircraft to convey information directly into the line-of-sight of a pilot without distracting the pilot from the outside view. Head-up displays generally comprise a combiner which incorporates a transparent glass or plastic sheet onto which relevant flight information is projected or otherwise transmitted.

It is necessary to be able to move the combiner out of its normal operating position into a stowed position since it is only used during critical phases of a flight path. It is important, however, that when the combiner is in the normal operating position, i.e. in the pilot's line-of-sight, it is locked relative to the cockpit in such a way that its freedom to move is severely restricted. It will be appreciated that this is a non-trivial technical problem due to the high level of vibration which can arise when an aircraft is travelling at high speed and the very low tolerance of the information projection system to movement of the combiner; often only a few microns.

It is an object of the present invention to provide apparatus for releasably locking a first member to a second member where the first is coupled to the second member for limited movement relative thereto when unlocked. It is also an object of the present invention to provide such locking apparatus which can be easily and quickly activated to lock and unlock the two members.

According to a first aspect of the present invention there is provided apparatus for releasably locking a first member to a second member where the first member is coupled to the second member for limited movement relative thereto when unlocked, the apparatus comprising:

a slot formed in the first member and having first and second abutment surfaces spaced apart in the direction of said movement;

a heel portion integral with or rigidly fixed to the second member and projecting from the second member into the slot and having third and fourth abutment surfaces spaced apart in the direction of said movement, said third abutment surface being arranged to engage said first abutment surface to limit relative movement in a first direction when the apparatus is unlocked; and a locking wedge mounted in the second member and moveable between a first release position in which the wedge lies outside the slot and a second locking position in which the wedge projects into the slot to engage both said second and fourth abutment surfaces when said first and third abutment surfaces are mutually engaged to prevent relative movement of the first and second members.

In an embodiment of the present invention said relative movement of the first and second members is in a rotational direction and said slot extends around a circumferential region of a substantially cylindrical axle portion of the first member, the axis of the cylindrical portion being coincident with the axis of rotation, such that the first and second abutment surfaces of the slot are circumferentially spaced. In this case the locking wedge is moveable in a substantially radial direction with respect to the axis of rotation.

Preferably, said slot has a first width over a first part of its length and a second, narrower, width over a second part of its length, said second abutment surface being provided at the interface between said first and second parts of the slot and said heel portion having a width which is less than the second narrow width of the slot. Said second abutment surface may comprise a pair of surfaces disposed on either side of the slot and, optionally, a surface projecting up from the bottom of the slot.

Preferably, the locking wedge comprises a pair or substantially planar abutment surfaces for engaging said second and fourth abutment surfaces, said pair of surfaces converging together towards the end of the wedge, i.e. to provide a substantially 'V' shaped end to the wedge. The tip of the wedge may be flat. The pair of abutment surfaces may converge at a half angle in the range of 10° to 16°.

In an alternative embodiment of the invention said relative movement of the first and second members is linear and said slot extends linearly along the first member in the direction of movement.

In a preferred embodiment of the present invention the second member comprises an elongate arm with rotatable mountings at each end and locking apparatus for each of these mountings. Preferably, the locking wedges of both locking apparatus are arranged to be operated by a single activation device. For example, both of the looking wedges may be arranged to lie along a common axis which extends substantially through the centre of the arm, movement of the locking wedges towards the centre of the arms causing the respective locking apparatus to be unlocked, Reciprocating motion of the locking wedges within the arm may be achieved by coupling a rotatable handle to the arms by way of rotary to linear motion conversion means. This means may comprise a wheel coupled to the handle for rotation therewith, e.g. by a wire or band, and coupled to both locking wedges by respective joint members.

In the preferred embodiment, the first member carries an optical component in the form of a combiner providing a head-up display unit for use in an aircraft.

For a better understanding of the present invention and in order to show the same may be carried into effect reference will now be made, by way of example, to the accompanying drawings, in which:

FIGS. 3A and 3B show in detail a lower lockable hinge mechanism of the display of FIG. 1;

FIG. 4 shows a looking wheel of the mechanism of FIG. 3;

FIGS. 5a and 5b show an operating mechanism for operating the lockable hinge mechanisms of FIGS. 1 to 4; and FIGS. 6 and 7 show in more detail the operating mechanism of FIG. 5 including spring bias means.

Figures 1, 2:
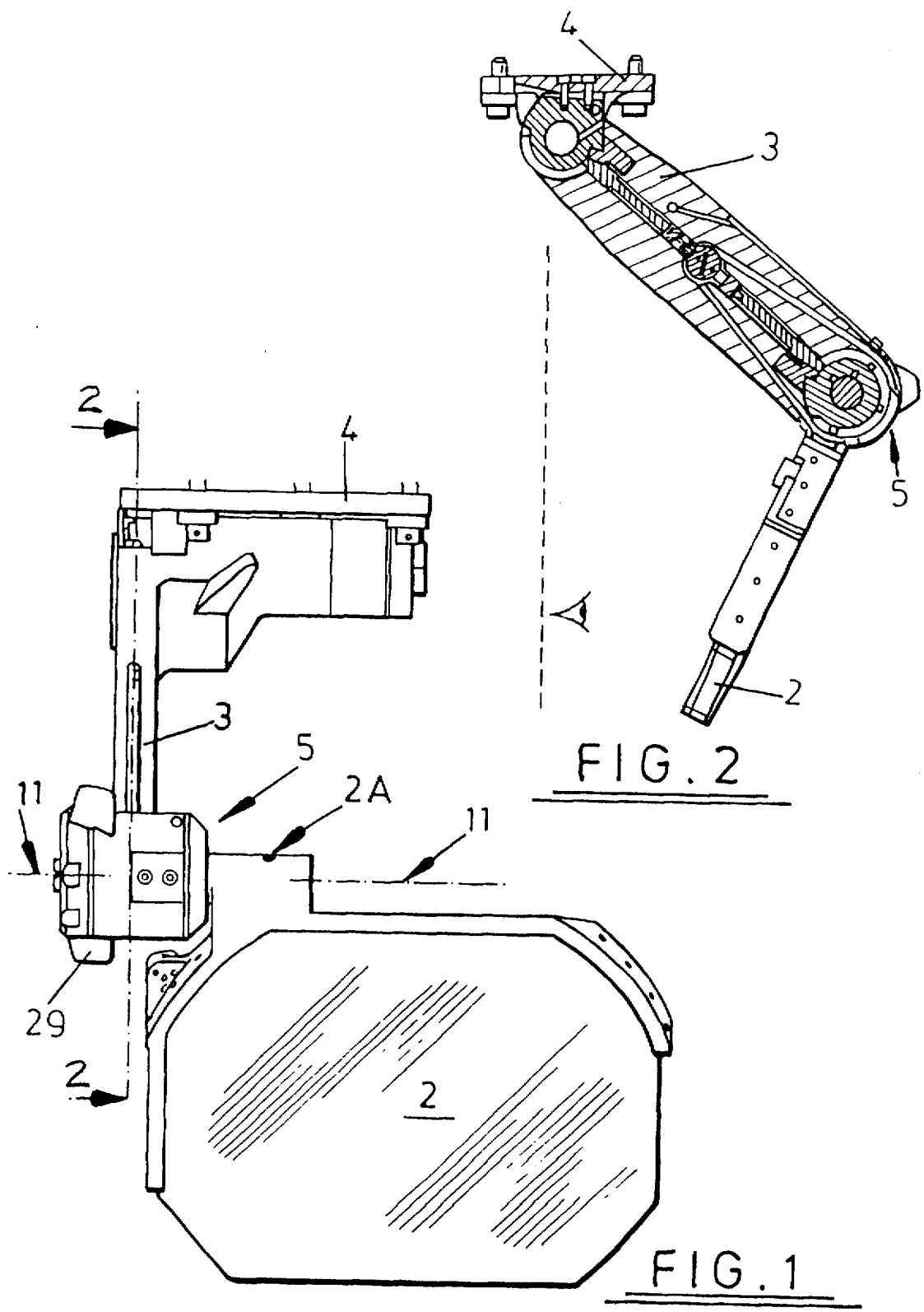
FIG. 1 shows a front view of a head-up display.
FIG. 2 shows a cross-sectional view, taken on the line A—A, of the head-up display of FIG. 1.

There is shown in FIGS. 1 and 2 a head-up display unit for use in an aircraft and which comprises a transparent glass or plastic combiner 2 onto which can be projected, in a known manner, aircraft information. The combiner 2 is rigidly secured to a carrier 2A which is rotatably mounted to one end of an arm 3 which at its other end is rotatably mounted in a unit 4 which is clamped to the ceiling of the aircraft cockpit. In the in-use position (or deployed position) as shown in FIG. 2 the combiner 2 is located directly in the pilot's line of sight and the arm 3 is oriented at an angle to the vertical such that it does not interfere with the pilot's field of view, both directly ahead and also to the side. This arrangement necessarily results in the centre of gravity of the head-up display not lying directly beneath the unit 4 which in turn can give rise to significant vibration of the combiner 2 if the various components of the head-up display are not extremely tightly secured. However, it is also a requirement of the head-up display that it can be stowed away so as not to interfere with the pilot's line-of-sight or head movement. In order to stow the head-up display unit, the carrier 2A is rotated, by means of a knurled handle 29, in an anti-clockwise direction as viewed in FIG. 2 whilst the arm 3 is simultaneously rotated in a clockwise direction. When this operation is completed the combiner 2 is folded against the arm 3 and both are parked against the ceiling of the aircraft cockpit.

To permit selective movement of the head-up display unit between its in-use and stowed positions and to hold the combiner 2 in its operating position with great repeatability, the rotatable mountings at each end of the arm 3 are implemented by similar lockable hinge mechanisms. In the interests of conciseness, only one mechanism 5 will be described in detail with reference to FIGS. 3 and 4.

The hinge mechanism 5 couples the lower region of the arm 3 to the combiner carrier 2A. The carrier 2A has a laterally projecting mounting collar 6 with an internal surface or bore 12 which rotatably receives a stub shaft 14 secured to arm 3 and extending along rotation axis 11. The external surface of the collar 6 is profiled to function as a locking wheels being provided with a slot 7 which extends circumferentially over an angle of approximately 270°. As shown in FIG. 4, the slot has a first axial width over the major portion 8 of its length and has a second wider axial width over the clockwise end of its length 9 with the slot preferably being deeper over length 9 then over portion 8 such that a U-shaped abutment surface 10 is provided at the interface between the narrow and wide portions. This abutment surface 10 is located in a plane which can be, but does not have to be, radial to the axis 11.

The lower end of the arm 3 which is coupled to the collar 6 comprises a circular recess 13 in the centre of which is provided the stub shaft 14 extending parallel to the axis of the recess. A locating slot 15 extends from the circular recess 13 a short distance into the arm 3, preferably parallel to the longitudinal axis of the arm, and receives a member 16 having a projecting heel 17 such that when this member 16 is secured into the slot 15, by means of bolts, adhesive or shrink fitting, the heel 17 projects a short distance into the slot 7 of the locking wheel 6. The heel 17 has a rectangular transverse cross-section and has an axial width (with respect to the rotation axis 11) such that, as the collar 6 is rotated &bout the shaft 14, the heel 17 can pass freely along the entire length of the slot 7. When the collar 6 is rotated fully clockwise in FIG. 3, the end surface 18 of the slot 7 abuts the opposed side surface 19 of the heel preventing further clockwise rotation of the collar. In this extreme position, a gap exists between the U-shaped abutment surface 10 of the slot and the opposed side surface 27 of the heel.

The arm 3 is provided with a second longitudinally extending recess 20 which extends from the circular recess 13 to a central portion of the arm. This recess 20 receives a slideably mounted locking member 21 which comprises an elongate body 22 and an arrow or wedge shaped end portion 23. The wedge-shaped end portion 23 is substantially V-shaped and tapers towards its free end with a half angle in the range 10° to 16°. The end portion 23 is rectangular in transverse cross-section to provide two opposed, planar, side surfaces 24,25. The tip 26 of the end portion is substantially flat.

When the locking member 21 is forced downwardly (by means which will be described hereinbelow), the wedge-shaped end portion 23 is pushed into the gap formed in the locking wheel slot 7 between the U-shaped abutment surface 10 and the heel side surface 27 and the transverse width of the wedge portion 23 is such that the tapered side surfaces of the locking wedge engage both the heel 17 and the abutment surface 10.

The surfaces 10 and 18 in slot 7 have an included angle of 25° and preferably when projected meet at a point lying between the floor of the slot 7 and the axis 11. The movement axis of locking member 21 is radial with respect to axis 11 and the tapered side surfaces 24,25 of the wedge 23 preferably lie at ±12½° to the movement axis. The side surfaces 19 and 27 of the heel 17 are plane parallel. With this arrangement the wedge 23 does not meet the floor of the slot before the abutment surfaces of the slot and the heel engage, preventing further insertion of the wedge. Providing that the wedge 23 is maintained in this position by an appropriate downward force, the locking wheel 6 has no freedom to rotate or vibrate with respect to the arm 3 and furthermore can be repeatedly deployed to precisely the same in-use position whether or not the locking member 21 is a tight fit in the recess 20.

When the locking wedge 23 is moved upwardly sufficient for it to clear the locking wheel slot 7, the collar 6 is free to rotate, with the heel 17 passing along the slot, until the extreme anti-clockwise face (hidden in FIGS. 3 and 4) of the slot approaches the side surface 27 of heel. At this location the slot 7 may again widen into a notch capable of receiving the wedge 23 alone to hold the unit in its stowed position. It is not necessary to be able to lock the locking wheel 6 in the stowed position with the same integrity as in the deployed position as there is no requirement for a high degree of stability when the combiner is stowed. The combiner 2 may therefore be maintained in this position for example either by use of the wedge 23 alone or by friction or by the coupling of a cylindrical torsion spring between the arm 3 and the combiner carrier 2A which acts to rotate the combiner to the stowed position when the locking mechanism is released.

The lockable hinge mechanism provided between the upper end of the arm 3 and the cockpit clamp unit 4 is substantially the same as the mechanism provided at the lower end as described but is arranged to allow rotation of the arm 3, relative to the clamp unit 4, away from the deployed position (utilising the locking wedge) in a clockwise direction to a stowed position. The locking wedge for the upper locking mechanism also extends along an axial recess in the arm to the centre of the arm.

FIGS. 5a and 5b illustrate a wire drive mechanism for simultaneously operating the upper and lower locking mechanisms. At their innermost ends the locking members 21 are coupled to a centrally mounted wheel 28 by respective articulated links 22. The knurled handle 29 engages a continuous wire (or band) 30 which extends around a groove provided around the circumference of the central wheel 28. Thus, rotation of the handle 29 in a clockwise direction causes the locking members 21 to move from an extended position (FIG. 5A), in which the respective locking mechanisms are locked, to a retracted position (FIG. 5B) in which the respective locking mechanisms are unlocked.

With reference to FIGS. 6 and 7, each of the locking members 21 is of a two part telescopic construction, a first part 31 of which is coupled to the central wheel 28 by the links 22. The second part 33 is slideably mounted within the first part 31 for linear movement between first and second positions and a cylindrical spring 34 is provided around the surface of the second member 33 extending between a first end stop on the second member and a second end stop on the first member. When the knurled handle 29 is rotated to the locking position, the cylindrical spring 34 acts to force the end of the locking wedge 23 into engagement with the slot 7 provided on the corresponding locking wheel 6 and hence to maintain the combiner 2 in a rigidly locked position.

It will be apparent that various modifications may be made to the above described embodiment within the scope of the present invention. For example, if the angular rotation which is required of the combiner is relatively small, the slot 7 provided on the collar 6 may comprise only the enlarged portion 9, i.e. the slot having only a single axial width along its length. In this embodiment, when the locking wedge is removed from the slot, the collar 6 will rotate a short distance until the wedge abuts the end of the slot.

It is also envisaged that the principle of the present invention can be applied to lock together components which are arranged to move linearly (or along any other path, e.g. arcuate) relative to one another.

We claim:

1. Apparatus comprising first and second members and arranged for releasably locking the first member to the second member where the first member is coupled to the second member for limited movement in a predetermined direction relative thereto when unlocked, the apparatus further comprising:
   a slot formed in the first member and having first and second abutment surfaces spaced apart along the direction of said movement;
   a heel portion integral with or rigidly fixed to the second member and projecting from the second member into the slot and having third and fourth abutment surfaces spaced apart along the direction of said movement, said third abutment surface being arranged to engage said first abutment surface to limit relative movement at one end of the direction of said movement when the apparatus is unlocked; and
   a locking wedge mounted on the second member and moveable between a first release position in which the wedge lies outside the slot and a second locking position in which the wedge projects into the slot to engage both said second and fourth abutment surfaces when said first and third abutment surfaces are mutually engaged to prevent relative movement of the first and second members.

2. The apparatus according to claim 1, wherein said slot has a first width over a first part of the slot length and a second, narrower, width over a second part of the slot length, said second abutment surface being provided at the interface between said first and second parts of the slot, and said heel portion having a width which is less than the second narrow width of the slot.

3. The apparatus according to claim 1, wherein the locking wedge is slidably mounted in a recess formed in the second member, said recess extending at right angles to said slot.

4. The apparatus according to claim 1, wherein said relative movement of the first and second members is rotational and said slot extends around a circumferential region of a substantially cylindrical axle portion of the first member, the axis of the cylindrical axle portion being coincident with the axis or rotation.

5. The apparatus according to claim 4, wherein an optical component is coupled to the first member to enable the optical component to be rotated relative to the second member and the second member comprises an elongate arm with the optical component and the first member located at one end of the arm, the other end of the arm being mounted for limited rotation about a second rotational axis substantially parallel to the first mentioned rotational axis and capable of being locked against such rotation by a second slot, heel portion, and locking wedge.

6. The apparatus according to claim 5, wherein both locking wedges are arranged to be operated by a single activation device.

* * * * *

UNITED STATES PATENT AND TRADEMARK OFFICE
CERTIFICATE OF CORRECTION

PATENT NO. : 5,755,417

DATED : 5/26/98

INVENTOR(S) : Gardam et al.

It is certified that error appears in the above-identified patent and that said Letters Patent is hereby corrected as shown below:

Column 2, line 46, delete "A—A" and replace with --2—2--.

Signed and Sealed this

Ninth Day of February, 1999

Attest:

Attesting Officer

Acting Commissioner of Patents and Trademarks